United States Patent

Demler, Sr.

[15] 3,640,309
[45] Feb. 8, 1972

[54] FLUID COUPLING WITH CONNECTION AND SEALING FEATURE

[72] Inventor: Henry William Demler, Sr., Lebanon, Pa.
[73] Assignee: AMP Incorporated, Harrisburg, Pa.
[22] Filed: Jan. 16, 1970
[21] Appl. No.: 3,447

Related U.S. Application Data

[63] Continuation-in-part of Ser. No. 613,608, Feb. 2, 1967, abandoned, which is a continuation-in-part of Ser. No. 517,747, Dec. 30, 1965, Pat. No. 3,378,282.

[52] U.S. Cl. .................................137/614.04, 251/149.5
[51] Int. Cl. .................................................F16l 37/28
[58] Field of Search ............251/149.1, 149.4, 149.5, 149.6; 137/322, 614.04; 285/304, 307, 308, 309, 343

[56] References Cited

UNITED STATES PATENTS

| | | | |
|---|---|---|---|
| 3,035,857 | 5/1962 | Williamson | 137/614.04 |
| 3,473,556 | 10/1969 | Johnson et al. | 137/322 |
| 2,383,249 | 8/1945 | Hardwick | 251/149.5 |
| 2,283,970 | 5/1942 | Buttnel | 251/149.4 |
| 2,313,223 | 3/1943 | Frank | 137/614.04 X |

*Primary Examiner*—William R. Cline
*Attorney*—Curtis, Morris and Safford, William J. Keating, Ronald D. Grefe, William Hintze, Adrian J. La Rue, Frederick W. Raring, Jay L. Seitchik and John P. Vandenburg

[57] ABSTRACT

A fluid connection device comprises mateable connection sections having openings therein which are brought into communication when the sections are secured together. A valve member means is movably mounted in the opening of the one section with the opening also having a spacer and sealing assembly and the valve member means is maintained in sealing engagement with the spacer and sealing assembly when the member is connected to a source of fluid supply, the valve member means being moved out of engagement with the spacer and sealing assembly via a tubular section on the other of the mateable sections when the mateable sections are secured together. Guide means are provided on the valve member means and the opening in which the valve member means is movably disposed to guide the valve member means during movement thereof along this opening.

9 Claims, 9 Drawing Figures

PATENTED FEB 8 1972
3,640,309
SHEET 1 OF 2
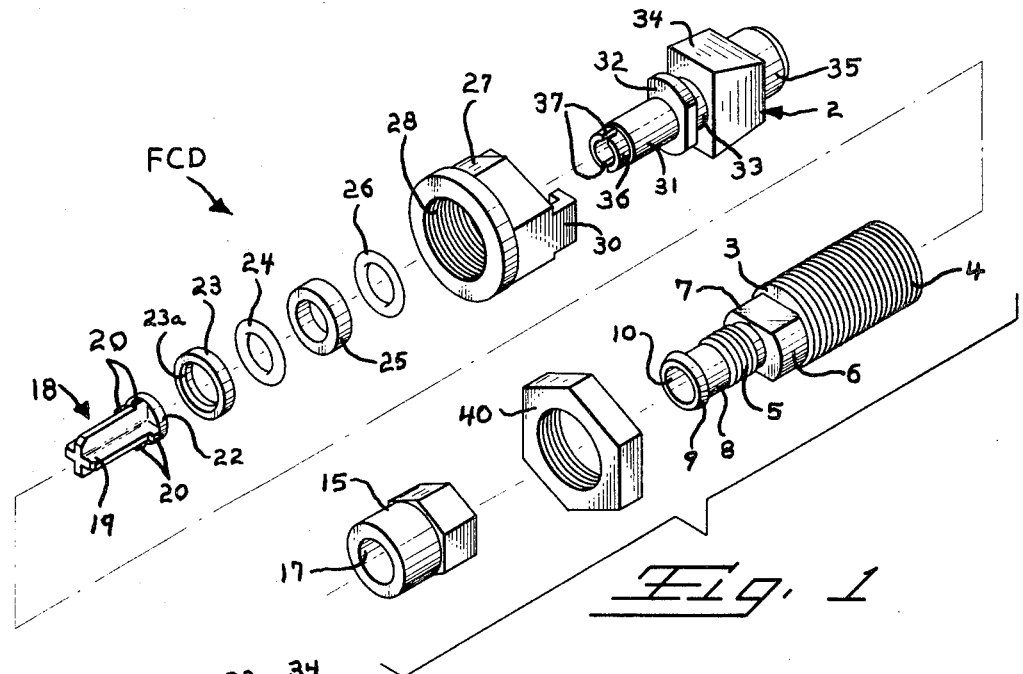
Fig. 1
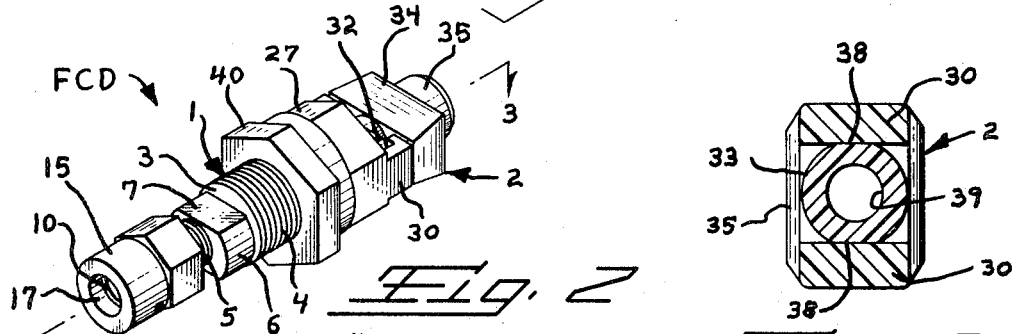
Fig. 2
Fig. 5
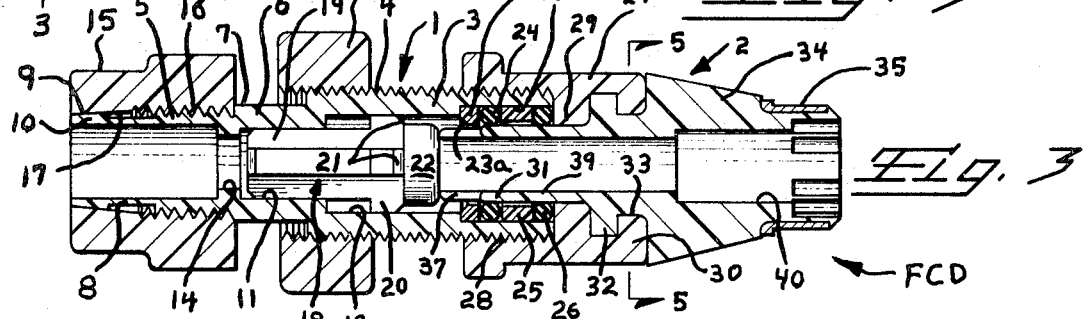
Fig. 3
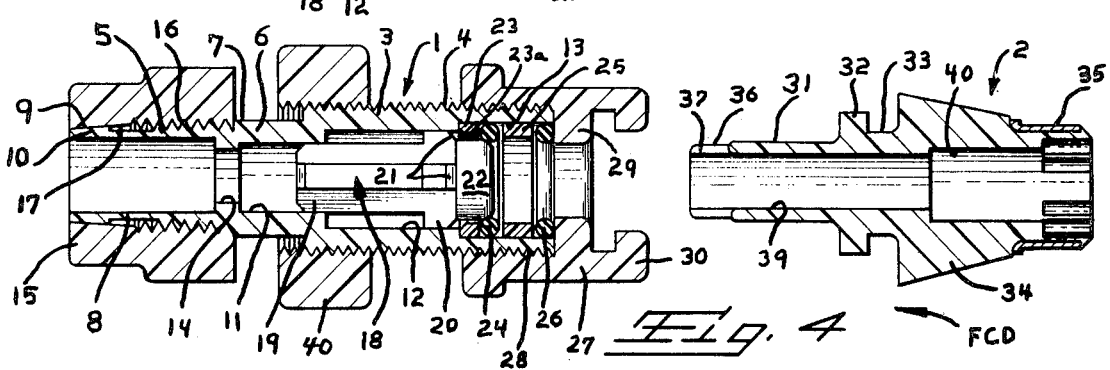
Fig. 4

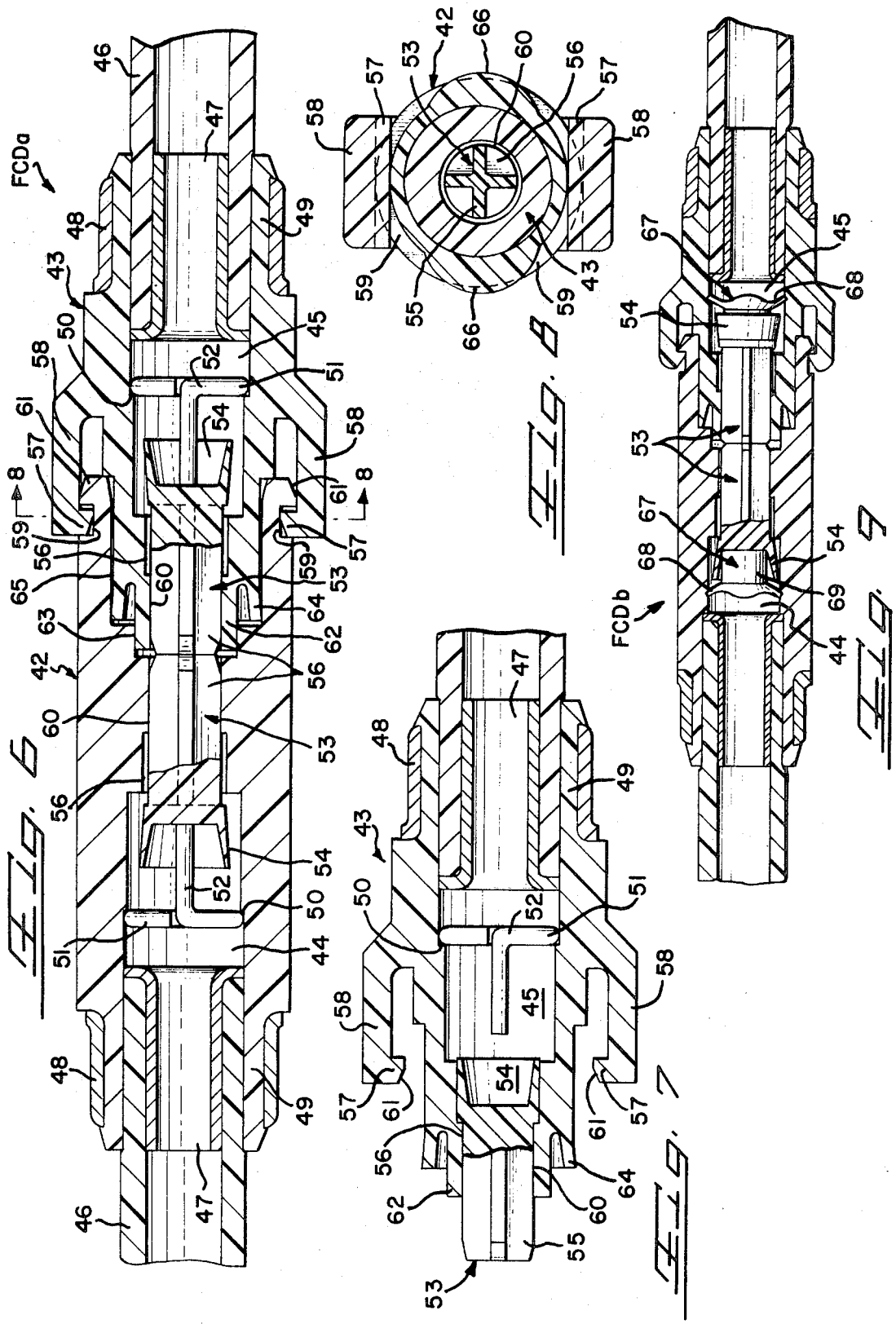

FLUID COUPLING WITH CONNECTION AND SEALING FEATURE

CROSS-REFERENCE TO RELATED APPLICATION

This invention is a continuation-in-part application of U.S. Pat. application, Ser. No. 613,608, filed Feb. 2, 1967, now abandoned, which, in turn, is a continuation-in-part application of U.S. Pat. application, Ser. No. 517,747, filed Dec. 30, 1965, and now U.S. Pat. No. 3,378,282, issued Apr. 16, 1968.

This invention relates to a connection device and more particularly to a connection device of the disconnect type to connect a source of supply to a conduit member or to interconnect conduit members with one of the conduit members being connected to a source of supply.

A fluid connection device comprises, according to the present invention, mateable connection sections that are devoid of grooves to receive O-rings and mold marks.

Disconnect-connection devices are made with grooves in the male and female parts with sealing means being generally disposed in the grooves in the female parts to form a fluid seal when the male and female parts are interengaged and the grooves in the male parts being engageable by latching means in the female parts to latch the connection devices together. In the case of molding the parts, the male or female parts are molded with parting lines. The formation of grooves and parting lines provides areas of leakage which is undesirable. In the case of the connection devices being made of metal, the grooves in the female and male parts have to be precisely machined to effect proper sealing which necessitates additional operations.

An object of the invention is to provide a fluid connection device devoid of any O-ring grooves in the mateable connection sections.

Another object of the invention is the provision of a fluid connection device that has no mold parting lines along the mateable connection sections.

A further object of the invention is to provide a fluid connection device provided with spaced sealing means to provide a constant seal upon connection and disconnection of the mateable sections.

An additional object of the invention is the provision of a fluid connection device provided with spaced sealing means that are readily replaceable.

A still further object of the invention is to provide a fluid connection device having spacer means to space sealing means and one of the spacer means acts as a bottoming means for an end of valve stem means.

Other objects and attainments of the present invention will become apparent to those skilled in the art upon a reading of the following detailed description when taken in conjunction with the drawings in which there are shown and described illustrative embodiments of the invention; it is to be understood, however, that these embodiments are not intended to be exhaustive nor limiting of the invention but are given for purposes of illustration in order that others skilled in the art may fully understand the invention and the principles thereof and the manner of applying it in practical use so that they may modify it in various forms, each as may be best suited to the conditions of a particular use.

The foregoing and other objects are achieved by a preferred embodiment of a fluid connection device which comprises a first member and a second member with each having an opening extending therethrough, valve member means movably mounted in the opening of the first member, an assembly including spacer means and sealing means disposed in the opening of the first member, means maintaining the assembly in position within the opening and having an aperture in communication with the opening, means on the first member for connecting the first member to a source of fluid supply with the pressure of the source of fluid supply normally maintaining the valve member means in sealing engagement with the sealing means, tubular means on the second member mateable with the aperture and the opening of the first member and engageable with the sealing means to provide a seal therebetween and with the valve member means to move the valve member means out of sealing engagement with the sealing means to permit communication between the openings of the members, means on the members to secure the members together, and means on the second member to secure the second member to a conduit member.

In the drawings:

FIG. 1 is a perspective exploded view of the elements of the fluid connection device;

FIG. 2 is a perspective view of the fluid connection device in an assembled condition;

FIG. 3 is a view taken along lines 3—3 of FIG. 2;

FIG. 4 is a view similar to FIG. 3 with the male section exploded from the female section;

FIG. 5 is a view taken along lines 5—5 of FIG. 3;

FIG. 6 is a cross-sectional view of an alternative embodiment of the invention;

FIG. 7 is a cross-sectional view of one part of the fluid connection device in a sealed condition;

FIG. 8 is a view taken along lines 8—8 of FIG. 6; and

FIG. 9 is a cross-sectional view of a further embodiment of the invention.

Turning now to the drawings, a fluid connection device FCD which is preferably molded from a suitable plastic material includes a female member 1 and a male member 2. Female member 1 comprises a body member 3 having threaded sections 4 and 5 on the exterior surface thereof which are spaced from each other by sections 6 having flat surfaces 7. A tubular section 8 extends outwardly from threaded section 5 which includes an annular tapered surface 9 at the outer end thereof.

Body member 3 has an opening extending therethrough which includes a first section 10, second section 11, third section 12 and fourth section 13. Sections 10 and 11 are separated from each other by an annular shoulder 14, section 12 has a larger diameter than sections 10 and 11 and section 13 has a larger diameter than any of the sections.

Cap 15 has an opening extending therethrough including a threaded section 16 mateable with threaded section 5 and a beveled section 17 mateable with tapered surface 9 so that when a tubular member is placed in first section 10 to annular shoulder 14, movement of cap 15 along sections 5 and 18 via threaded sections 5 and 16 causes beveled section 17 to move the area of tubular section 8 containing tapered surface 9 inwardly as a result of the inner engagement between beveled section 17 and tapered surface 9 thereby securing the tubular member connected to a source of fluid supply therein.

A valve member 18 comprises a cross-shaped section 19 which is movably disposable in sections 11 and 12 of body member 3 and the diameter of section 19 is such so as to fit within section 11 and be easily movable therealong. Each of the segments of section 19 has an extension 20 and the diameter of section 19 and extensions 20 is such so that extensions 20 are disposable in and movable along section 12 of body 3. Extensions 20 have beveled surfaces 21 that merge with annular section 22. The dimensions between section 19 and section 11 and between section 12 and extensions 20 are such that the valve member is guided thereby.

A sealing assembly is disposed within section 13 of body 3 and comprises an inner spacer 23, and O-ring 24, an outer spacer 25 and another O-ring 26. Each of the spacers has an opening extending therethrough and inner spacer 23 has a tapered surface 23a mateable with beveled surfaces 21 of extensions 20 and annular section 22 is fitable through the opening in spacer 23.

Cap 27 is provided with an internally threaded surface 28 mateable with threaded section 24. An annular shoulder 29 is located at the inner end of threaded surface 28 and opposing L-shaped lugs 30 extend outwardly from shoulder 29. Annular shoulder 29 maintains the sealing assembly within section 13 of body 3 and the sealing assembly or elements thereof may be readily replaced when necessary.

Male member 2 comprises a tubular section 31, a flange 32, a round section 33, an engaging section 34 and a securing section 35. Tubular section 31 necks down into a slotted section 36 having opposing slots 37 therein. The exterior surface connecting tubular section 31 and slotted section 36 is radiused. Flange 32 has a width equal to the diameter of round section 33 and the ends extend beyond round section 33 and are arcuate. Round section 33 has flat surfaces 38 in alignment with the arcuate ends of flange 32. Engaging section 34 has a pair of opposing surfaces in alignment with the sides of flange 32 and these surfaces taper in a converging manner toward round section 33. Engaging section 34 also has another pair of opposing surfaces in alignment with the arcuate ends of flange 32 and these surfaces taper in a converging manner towards securing section 35. The pairs of opposing and tapered surfaces of engaging section 34 facilitates the engagement of male member 2 by an operator for insertion in and removable from female member 1. The opening through the male member includes a first section 39 in communication with a larger section 40. Securing section 35 preferably takes the form disclosed in U.S. Pat. application, Ser. No. 517,747, filed Dec. 30, 1965 and now U.S. Pat. No. 3,378,282, issued Apr. 16, 1968, but it can take any other form to secure a tubular member within the section 40 of male member 2.

With valve member 18 in position within sections 11 and 12 of body 3 and sealing assembly 23 through 26 in position in section 13 and held therein by cap 27, the pressure of the fluid from the source of supply maintains valve member 18 in engagement with the sealing assembly as illustrated in FIG. 4 such that annular section 22 extends through inner spacer 23 in engagement with O-ring 24 and beveled surfaces 21 of extensions 20 mate with tapered surface 23a of spacer 23. Thus, the fluid maintains valve member 18 in a sealing position so that the fluid pressure remains constant.

When it is desired to connect the fluid supply to a member connected to male member 2, slotted section 36 and tubular section 31 are introduced into female member 1 through annular shoulder 29 of cap 27 and within the sealing assembly. As sections 36 and 31 enter the sealing assembly, O-ring 26 engages tubular section 31 before slotted section 36 engages annular section 22 of valve member 18 so that annular section 22 is not removed from engagement with O-ring 24 until tubular section 31 is sealingly engaged with O-ring 26. Now that tubular section 31 is in sealing engagement with O-ring 26, further movement of sections 36 and 31 along the sealing assembly causes slotted section 36 to engage annular section 22 thereby moving valve member 18 along sections 11 and 12 of the opening of body member 3 causing communication between female member 1 and male member 2 via slotted section 36 moving valve member 18 out of sealing engagement with O-ring 24 without any loss of fluid pressure. Sections 36 and 31 are moved into female member 1 until flange 32 engages annular shoulder 29 whereupon male member 2 is rotated relative female member 1 causing the arcuate ends of flange 32 to be disposed in communication with lugs 30 thereby securing the male and female members together in a sealed condition. The distance between the inner ends of lugs 30 is such that the sides of flange 32 and those portions of round section 33 in communication therewith merely clear the inner ends of lugs 30 so that when male member 2 is rotated relative to female member 1, the radiused sections of section 33 cam lugs 30 outwardly; and, when the arcuate ends of flange 32 are disposed behind the inner ends of lugs 30, the inner ends of lugs 30 engage flat surfaces 38 thereby serving to maintain the male and female members in a latched position because of the forces required to cam lugs 30 away from the axis of the fluid connection device.

The radiused surface between tubular section 31 and slotted section 36 minimizes wear on the O-rings. If desired, spring means can be placed between extensions 20 and the inner surface of section 12 that merges with section 11 to maintain valve member 18 in a sealed position when the male member has been disconnected from the female member. As can be discerned, no grooves in which O-rings are to be disposed and no mold lines are formed on tubular section 31 to provide leakage areas and the sealing assembly is unique in that parts can be readily replaced. Inner spacer 23 acts as a bottoming means for the valve member.

A nut 41 is threadably mounted on threaded section 4 so that body member 3 can be removably mounted in an aperture of a panel (not shown) between cap 27 and nut 41.

FIGS. 6–8 illustrate fluid connection device FCDa, which is an alternative embodiment. Male member 42 and female member 43 of the fluid connection device FCDa have a bore 44, 45 in which ends of plastic or elastomeric tubular member 46 having a shouldered insert 47 are disposed. A malleable ferrule 48 is located on a reduced section 49 of members 42 and 43 and they are subjected to radial crimping pressure to secure the ends of tubular members 46 within the bores with inserts 46 supplying a backup member to prevent the ends of the tubular members from collapsing.

Each bore 44, 45 has a first shoulder 50 against which a G-shaped stop member 51 engages to limit their inner movement within the bores, outer movement of stop members 51 being limited by the ends of the tubular members. The spring characteristics of the G-shaped part causes the stop member to frictionally engage the surface of the bore and retain the stop members against the shoulders 50. Extensions 52 extend centrally from the center inwardly directed leg of the G-shaped part.

Valve members 53 are slidably disposed in bores 44, 45 and they include a cup-shaped sealing section 54 and a cross-shaped ribbed section 55. The walls of sealing sections 54 are flexible due to their tapered configuration and they sealingly engage sections 56 of the bores as a result of their larger diameter and flexibility when they are seated in sections 56 and which limits movement of valve members 53 within the bores in a sealing direction. Extensions 52 fit within the cup-shaped sealing sections 54 and limit the movement of valve members in a nonsealing direction so that the valve members are maintained in the bores and they will not obstruct the flow of the fluid by engagement with the ends of the tubular members.

Either member 42 or 43 can be connected to a fluid supply via tubular members 46 and the pressure of the fluid will maintain valve member 53 in a sealing position when members 42 and 43 are disconnected from each other.

When members 42 and 43 are connected together via inwardly directed lugs 57 of arms 58 on member 43 being snappingly disposed within diametric channels 59 of member 42, ends of valve members 53 engage each other thereby moving the cup-shaped sealing sections 54 free of sealing sections 56 so that fluid flows from one member through the other member via cross-shaped sections 55 which are freely movable along section 60 of the bores. Beveled surfaces 61 are located on lugs 57 and the end of member 42 to facilitate movement of arms 58 outwardly so that lugs 57 can easily be moved into into channels 59 to latch the members 42 and 43 together.

A tubular section 62 of member 43 fits into section 63 of bore 44, and an integrally flared stiffly flexible annular skirt 64 sealingly engages section 65 of bore 44, section 65 having a beveled entrance to facilitate movement of skirt 64 along section 65. The resilient nature of skirt 64 in engagement with section 65 and the pressure of the fluid assure that an excellent sealing will be accomplished and such sealing is effected prior to the valve members being moved out of their sealing positions so that no loss of fluid or pressures occurs when the members are latched together.

Arcuate camming projections 66 are in communication with channels 59 and they extend slightly outwardly beyond the diameter of member 42 so that lugs 57 can be cammed free of channels 59 upon rotation of the members relative to one another to permit the members to be disconnected upon axial relative movement therebetween.

Fluid connection device FCDb, which is illustrated in FIG. 9, is similar in every respect to that of fluid connection device FCDa except that stop members 67 are provided with teeth 68 which bite into the wall of bores 44, 45 to position the stop members therein. Spaces are of course provided between the teeth 68 to permit passage of the fluid, and the stop members have annular projections 69 which fit into the cup-shaped sealing section 54 to limit outer movement of valve members 53.

It is to be understood that one of members 42 or 43 may be provided with a valve member 53 and this member is connected to a source of fluid supply while the other member need only be provided with a means to operate the valve member 53 from its seated to an unseated position when the members 42, 43 are connected together.

It will, therefore, be appreciated that the aforementioned and other desirable objects have been achieved; however, it should be emphasized that the particular embodiments of the invention, which are shown and described herein, are intended as merely illustrative and not as restrictive of the invention.

The invention is claimed in accordance with the following:

1. A fluid connection device, comprising: a first member and a second member with each member having a bore extending therethrough, valve member means movably mounted in at least one bore of one of said members, one section of said valve member means having a cup-shaped configuration for sealing engagement with one section of said bore when said valve member means is positioned in a sealing position, another section of said valve member means having a configuration permitting passage of a fluid when said valve member means is positioned in a nonsealing position, operating means provided by said members for moving said valve member means to said nonsealing position when said members are brought into engagement, sealing means provided by said members to provide a sealed condition when said members are brought into engagement, latching means provided on said members to latch said members together, said latching means comprising diametric channel means in an exterior surface adjacent one end of one of said members and latching arms provided with latching lugs extending outwardly from the other of said members for engagement with said channel means, and arcuate projections are provided on said one of said members which are in communication with said channel means, said members are rotatable relative to each other with said latching lugs being movable along said channel means and into engagement over said arcuate projections upon relative rotation of said members, said arcuate projections camming said latching lugs received thereover out of said channel means to allow disconnecting of said members from each other.

2. A fluid connection device according to claim 1 wherein stop means are provided in said bore outwardly from said valve member means to limit outer movement of said valve member means.

3. A fluid connection device according to claim 1 wherein said sealing means comprises integral annular stiffly flexible skirt means on one of said members in sealing engagement with the bore of another of said members.

4. A fluid connection device, comprising: first and second coupling members each having a hollow interior, a first valve member freely slidable longitudinally within the hollow interior of one of said members, a second valve member freely slidable longitudinally within the hollow interior of other of said coupling members, each of said valve members having a cup-shaped sealing member at one end and a ribbed portion at the other end, each of said coupling members includes motion limiting means in communication with the hollow interior thereof for receiving said cup-shaped sealing member in registration thereagainst, each of said valve members being freely slidably actuated in response to fluid pressure internally of the respective coupling members until registration of said cup-shaped sealing member in sealing relationship on said motion limiting means, said ribbed portions of the respective valve members engaging one another upon coupling together said coupling members, each of said cup-shaped sealing members being freely slidably disengaged from the respective motion limiting means upon engagement of said ribbed portions with each other, said hollow interiors of said coupling members being in communication upon engagement of said ribbed portions with each other, and upon cup-shaped sealing members being disengaged from the respective motion limiting means.

5. The structure as recited in claim 4, and further including: fixedly positioned, nonmovable stop member means internally of the hollow interiors of respective coupling members and engageable upon the cup-shaped sealing member of a corresponding valve member for limiting freely slidable movement of said corresponding cup-shaped sealing member upon disengagement thereof from said respective motion limiting means.

6. The structure as recited in claim 5, wherein said one end of each valve member is engaged against said stop means, and the other end of each valve member is engaged against said ribbed portion of the other of said valve members when said coupling members are coupled to each other.

7. The structure as recited in claim 6, and further including: annular stiffly flexible skirt means on one of said coupling members in sealing engagement within the hollow interior of the other of said coupling members.

8. The structure as recited in claim 7, and further including: latching means including a channel means in an exterior surface of one of said coupling members, and latching arms provided with projecting latching lugs on the other of said coupling members and engageable within said channel means.

9. The structure as recited in claim 8, and further including: arcuate projections located in communication with said channel means, said coupling members being rotatable relative to each other, and said latching lugs being movable within said channel means and received over said arcuate projections upon relative rotation of said coupling members, said arcuate projections adapted to cam said latching lugs out of said channel means to enable disconnection of said coupling members.

* * * * *